United States Patent [19]

Huff et al.

[11] Patent Number: 5,023,300

[45] Date of Patent: Jun. 11, 1991

[54] THERMOPLASTIC OLEFIN ALLOYS AND METHOD FOR PRODUCING THE SAME

[75] Inventors: Terrence Huff, Baytown; James J. McAlpin, Houston, both of Tex.

[73] Assignee: Exxon Chemical Patents Inc., Linden, N.J.

[21] Appl. No.: 354,358

[22] Filed: May 23, 1989

Related U.S. Application Data

[63] Continuation-in-part of Ser. No. 140,462, Jan. 4, 1988, abandoned.

[51] Int. Cl.$^5$ .................. C08L 23/26; C08L 23/04; C08L 23/16
[52] U.S. Cl. ................... 525/194; 525/240; 525/322; 525/323; 525/324; 525/197
[58] Field of Search ............ 525/88, 194, 322, 323, 525/240

[56] References Cited

U.S. PATENT DOCUMENTS

| | | | |
|---|---|---|---|
| 3,442,978 | 5/1969 | Khelghatian | 525/323 |
| 3,974,236 | 8/1976 | Koga et al. | 525/323 |
| 4,113,802 | 9/1978 | Matteoli et al. | 525/270 |
| 4,128,606 | 12/1978 | Furutachi et al. | 525/247 |
| 4,245,062 | 1/1981 | Suzuki et al. | 525/240 |
| 4,375,531 | 3/1983 | Ross | 525/240 |
| 4,547,552 | 10/1985 | Toyota et al. | 525/247 |
| 4,576,994 | 3/1986 | Dorrer et al. | 525/323 |

FOREIGN PATENT DOCUMENTS

| | | | |
|---|---|---|---|
| 54-001386 | 1/1979 | Japan | 525/88 |
| 61-085462 | 5/1986 | Japan | 525/88 |
| 64-10006 | 1/1989 | Japan . | |
| 2134122 | 8/1984 | United Kingdom | 525/88 |

*Primary Examiner*—Carman J. Seccuro
*Attorney, Agent, or Firm*—M. B. Kurtzman; M. E. Wilson

[57] ABSTRACT

A thermoplastic olefin comprising an alloy of an olefin copolymer elastomer and a propylene/comonomer random copolymer is provided. The comonomer is selected from one or more of ethylene and $C_4$ to $C_{10}$ alpha-olefins. Polypropylene is an optional component of the alloy. The alloy may be produced by melt blending, reactor blending or a combination thereof, of the various components.

10 Claims, 1 Drawing Sheet

THERMOPLASTIC OLEFIN ALLOYS AND METHOD FOR PRODUCING THE SAME

This application is a continuation-in-part of U.S. Ser. No. 140,462, filed 1/4/88, now abandoned.

BACKGROUND OF THE INVENTION

The present invention relates generally to thermoplastic elastomer compositions. More particularly, the present invention relates to thermoplastic olefin alloys of olefin copolymer resins and olefin copolymer elastomers.

Rubber products have generally found extensive use in applications which require elasticity and flexibility. Molding of rubber into a finished product entails a curing step, generally referred to as vulcanization, which requires the use of specialized molding machines, long cycle times and a number of complicated processing steps. The rubber molding process, therefore, does not lend itself to mass production due to these processing difficulties. It would be highly desirable to find a rubber substitute which has the desirable properties of rubber without the need for a vulcanization step.

Many attempts have been made to find such rubber substitutes. For example, flexible plastics such as flexible vinyl chloride resins, ethylene/vinyl acetate copolymers and low density polyethylenes generally have good flexibility, fabrication and molding properties, but suffer from poor heat resistance, impact strength and resiliency (rebound) which greatly restrict their utility.

In order to improve the properties of such flexible plastics, they have been blended with high melting point plastics such as high density polyethylene and polypropylene. This blending, however, causes a loss in flexibility. Also molded articles of good quality cannot be produced due to flowmarks, sinkmarks and other imperfections which may occur during the molding process.

More recently, a class of compounds having properties between those of cured rubbers and soft plastics are being investigated. These compounds are generally referred to as thermoplastic elastomers (TPE). The classical TPE structure involves a matrix of an elastomer such as, for example, a polybutadiene, polyester or polyurethane, with a crosslinked network tied together by thermoplastic junction regions. A well known example of a TPE is Shell's Kraton ® G, an SBS triblock of styrene and hydrogenated polybutadiene, where the thermoplastic crosslinking points are small domains of glassy polystyrene held together by polybutadiene blocks. This structure leads to behavior similar to vulcanized elastomers but, at temperatures above the polystyrene softening point, the system undergoes plastic flow.

A subset of thermoplastic elastomers, embodying only olefin based polymers, is referred to as thermoplastic olefins (TPO). A typical TPO comprises a melt blend or like mixture of a polyolefin resin, generally polypropylene, with an olefin copolymer elastomer (OCE). The polyolefin resin will give the TPO rigidity and temperature resistance while the elastomer imparts flexibility and resilience as well as improving the toughness of the material.

TPOs find particular application in the auto industry for flexible exterior body parts such as, for example, bumper covers, nerf strips, air dams and the like. In such applications, it is desired that the TPO have good resiliency (ability of the part to return to its original shape after deformation), impact strength at low temperatures, flexibility, high heat distortion temperature, surface hardness and surface finish characteristics. Additionally ease of processability and molding is desired.

Other applications for TPOs include films, footwear, sporting goods, electric parts, gaskets, water hoses and belts, to name just a few. Particularly in films, elasticity and clarity properties are important. Other of the aforementioned properties will be important depending upon the desired application.

The prior art discloses a wide variety of TPOs and processes for producing the same. For example, U.S. Pat. Nos. 3,806,558 and 4,143,099 (both incorporated by reference herein for all purposes as if fully set forth) teach a TPO comprising a blend of an olefin copolymer elastomer, typically an ethylene-propylene or ethylene-propylene-nonconjugated diene elastomer, with a polyolefin resin, typically polypropylene. The blend is produced by mixing these two components in the presence of an organic peroxide curing agent to partially cure the elastomer.

In order to yield such a TPO with good flexibility and heat distortion resistance, however, it has been necessary to use 50% or more by weight of the OCE. This high OCE content produces a TPO which is not very suitable for injection molding due to poor melt flow properties resulting in flow lines, weld lines and other surface imperfections in the molded parts. Additionally, the OCE is a more expensive component of the TPO, and the use of less OCE is highly desirable to lower product costs.

SUMMARY OF THE INVENTION

The present invention, therefore, provides a TPO having desirable resiliency, impact strength, flexibility, heat distortion, surface hardness, surface finish, elasticity, clarity and moldability properties depending upon the desired end use.

The present invention also provides such a TPO which utilizes less OCE than conventional TPOs.

Additionally, the present invention provides methods for producing such TPOs whereby the aforementioned properties may be easily tailored to suit the desired end use without the use of a costly blending or compounding step.

In accordance with the present invention, there is provided a TPO which, in its overall concept, comprises an alloy of (1) from about 12% to about 23% by weight, based upon the weight of the alloy, of an olefin copolymer elastomer (OCE); (2) from about 25% to about 88% by weight, based upon the weight of the alloy, of a random copolymer (RCP) resin of propylene and ethylene; and (3) from 0% to about 33% by weight, based upon the weight of the alloy, of polypropylene.

These three principal components may be blended, formed or otherwise mixed by any one of a number of suitable methods to produce the TPO alloys of the present invention. For example, the TPO may be produced by melt blending the various components or by reactor blending the RCP and/or OCE then melt blending with the other components as further detailed below.

TPOs in accordance with the present invention offer numerous advantages over conventional formulations. For the same degree of flexibility, the present TPOs can be formulated to contain much less OCE than conventional TPOs. This yields a product with molding performance similar to that of polypropylene, and significantly higher heat resistance and lower cost than prior TPOs due to the use of less OCE.

Because of the additional variables of utilizing three components (the RCP, OCE and polypropylene) in the alloy, with the capacity to alter the comonomer content of the RCP, the properties of the alloy can be tailored in a much more precise fashion. The methods for producing these alloys, as detailed below, easily allow for this tailoring.

These and other features and advantages of the present invention will be more readily understood by those skilled in the art from a reading of the following detailed description with reference to the accompanying drawing.

DETAILED DESCRIPTION OF THE PREFERRED EMBODIMENTS

Figure 1:
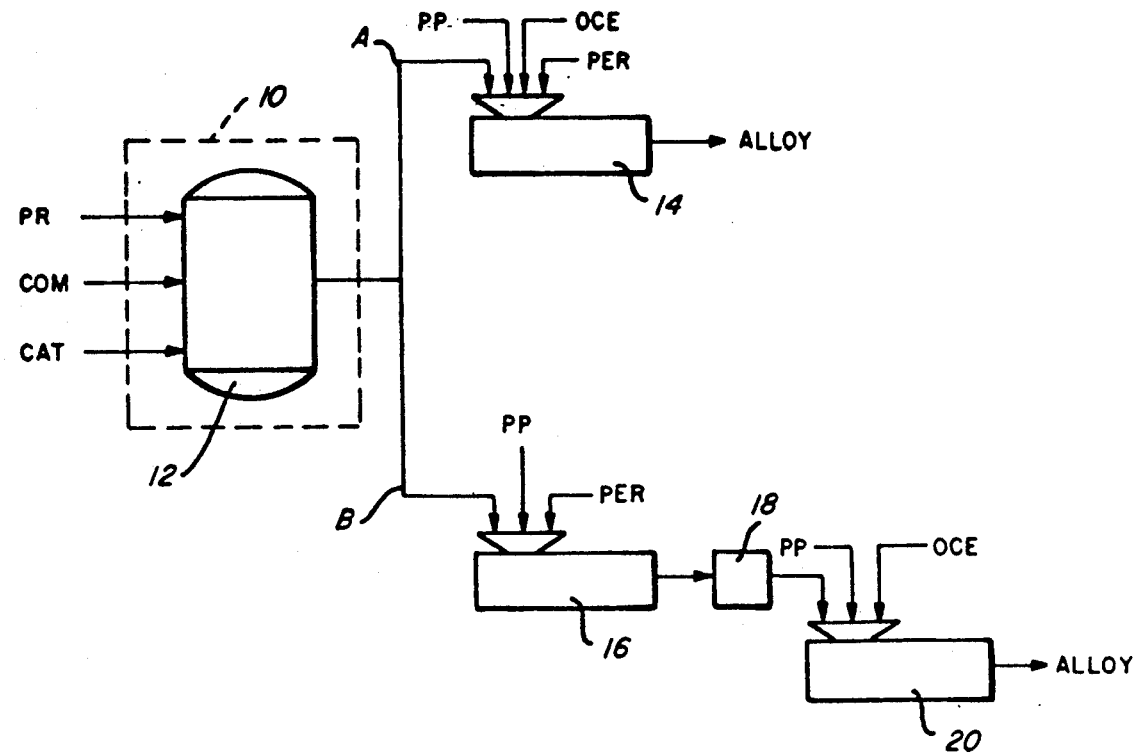
FIG. 1 is a schematic illustrating several preferred process schemes for producing TPO alloys in accordance with the present invention.

As previously indicated, the thermoplastic olefins (TPO) of the present invention, in their overall concept, comprise an alloy of an olefin copolymer elastomer (OCE) with a random propylene/monoolefin copolymer (RCP) resin. Polypropylene may also be included as a component of the alloy. Alloy, as that term is used herein, means any various blend or other like mixture of the various components.

The OCE is utilized in the alloy in amounts ranging from about 12% to about 23% more preferably from about 15% to about 20% by weight based upon the weight of the alloy. The OCE is added to impart flexibility, resilience and toughness, particularly at lower temperatures, to the alloy. The inclusion of lower amounts of the OCE, however, will generally improve surface hardness, heat distortion, appearance and processability properties of the TPO alloys while also generally lowering their cost of manufacture.

The OCE comprises an elastomeric random copolymer of two or more monoolefins. Normally one of the monoolefins is ethylene and another is a $C_3$ to $C_{10}$ alpha-olefin such as, for example, propylene, 1-butene and 1-hexene. Suitable OCEs include, for example, an ethylene-propylene copolymer elastomer or an ethylene-propylene-nonconjugated diene terpolymer elastomer. The nonconjugated diene, for example, may be dicyclopentadiene, 1,4-hexadiene, dicyclooctadiene, methylenenorbornene or ethylidenenorbornene.

The OCEs useful in the alloys of the present invention preferably have a Mooney viscosity greater than about 20 (ML(1+8) at 212° F.), more preferably, between about 20 to about 120, most preferably between about 35 to about 85. The percentage of ethylene in the OCE should be greater than about 30% by weight, more preferably between about 40% to about 80% by weight, but the particular amount has not been found to be critical to the invention. When a terpolymer OCE is utilized, the OCE generally comprises from about 1% to about 10% by weight of the nonconjugated diene, but again the particular amount has not been found critical to the invention.

OCEs having the above-described properties and methods for making the same are well known in the art, and are readily available commercially from a number of manufacturers. These elastomers may also be produced in a sequential reactor as described below.

The propylene/monoolefin RCP is utilized in the alloy in amounts ranging from about 25% to about 88% more preferably from about 50% to about 88% by weight based upon the weight of the alloy. The propylene/monoolefin RCP is added to control the flexibility of the alloy as well as to impart a better balance between the flexibility, heat resistance and moldability characteristics of the alloy. The RCP may also improve the heat distortion, low temperature impact and surface hardness properties of the TPO alloy. Since the RCP allows control of the flexibility, the use of the OCE can be restricted to only the amount required to impart the desired resilience and toughness properties.

As just indicated, the RCPs useful in the alloys of the present invention comprise a random propylene/ethylene copolymer.

The RCP comprises an ethylene content from about 3% to about 8%, more preferably from about 4% to about 6%, by weight based upon the weight of the RCP.

Such RCPs may have a wide range of melt flow rates (MFR), generally up to about 100 g/10 minutes (ASTM D1238, Condition L), as well as wide ranging molecular weight distributions (MWD). As used herein, MWD can be estimated from the ratio of the MFR at 230° C., 10000 g, to the MFR at 230° C., 2160 g (melt flow ratio).

Such RCPs may be produced by polymerizing propylene and ethylene in the presence of any one of a number of well-known Ziegler-type catalysts suitable for producing propylene-based random copolymers. Particularly preferred catalysts and processes are those described in U.S. Pat. Nos. 4,127,504, 4,330,649 and 4,543,400, all of which are incorporated by reference for all purposes as if fully set forth.

Polypropylene is utilized in the alloy in amounts ranging from 0% to about 33% by weight based upon the weight of the alloy. Polypropylene is generally added to the TPO alloy to improve its thermoplasticity, stiffness, heat distortion, surface hardness and processability properties.

Polypropylene useful in the alloys of the present invention is normally solid and isotactic, i.e., greater than 90% hot heptane insolubles, having an MFR of from about 0.1 to about 100 g/10 minutes. As is known, such polypropylene is normally crystalline with a density range from about 0.89 to about 0.91 g/cc. Preferably, a polypropylene having an MFR between about 0.2 to about 12.0 is employed. Also it is preferred that the polypropylene have a melt flow ratio of from about 10 to about 50. The polypropylene may also include minor amounts of ethylene and/or other monoolefins such as, for example, 1-butene or 1-hexene, in amounts up to about 3 mol %. The actual properties of the polypropylene employed, of course, will be chosen based upon the method of producing the alloy and ultimate use of such alloy.

Such polypropylenes and methods for making the same are well-known in the art and are readily available commercially from a number of manufacturers.

Pigments, fillers, stabilizers, antioxidants, ultra-violet screening agents, antistatic agents, nucleating agents, certain processing oils and the like may optionally be included within the present TPO alloys; however, this should not be considered a limitation of the present invention.

The three principal components, i.e., polypropylene, RCP resin and OCE, may be blended, formed or otherwise mixed by any one of a number of suitable methods to produce the TPO alloys of the present invention.

For example, the TPO alloy may be produced by melt blending in one or more stages the desired amounts of RCP resin, polypropylene and OCE, within the ranges described above, under intense mixing conditions at a temperature of between about 175° C. to about 250° C. for a time sufficient to insure that the components are adequately integrated. Additionally, more than one type or form of each of the components may be concurrently utilized. This melt mixing can be accomplished in, for example, a Banbury mixer, Farrel Continuous mixer, single screw extruder, twin screw extruder or the like. The resulting alloy may be pelletized or otherwise processed for storage or further use.

To adjust the melt flow properties of the resulting alloy, one or more organic peroxides may be added during this melt mixing. The organic peroxide will react with the RCP resin and polypropylene to cause some molecular decomposition, resulting in an overall decrease in molecular weight and, consequently, increase in the MFR. If a non-conjugated diene OCE terpolymer is utilized, some slight degree of crosslinking may occur between the OCE molecules, but this small amount of crosslinking has not been found to substantially affect the properties of the TPO alloy so produced. Otherwise, the organic peroxide does not substantially affect the OCE.

These decomposition processes and suitable organic peroxides are well known in the art. For example, U.S. Pat. Nos. 4,143,099 and 4,212,787 disclose decomposition processes and numerous suitable organic peroxides, and are incorporated by reference herein as if fully set forth. Suitable organic peroxides include, for example, dicumyl peroxide, di-tert-butyl peroxide and 2,5-dimethyl-2,5-di(tert-butylperoxy)hexane.

The organic peroxides are utilized in amounts ranging from about 100 to about 2500 parts per million by weight based upon the weight of the RCP resin and polypropylene. The RCP resin and, optionally, polypropylene and OCE, are melt mixed under the aforementioned temperature conditions until the desired degree of molecular breakdown, i.e., the desired MFR, has occurred. It is well within the skill in the art to choose the particular organic peroxide, mixing conditions, temperature and time based upon the physical properties of the initial resins and desired end MFR.

Figure 2:
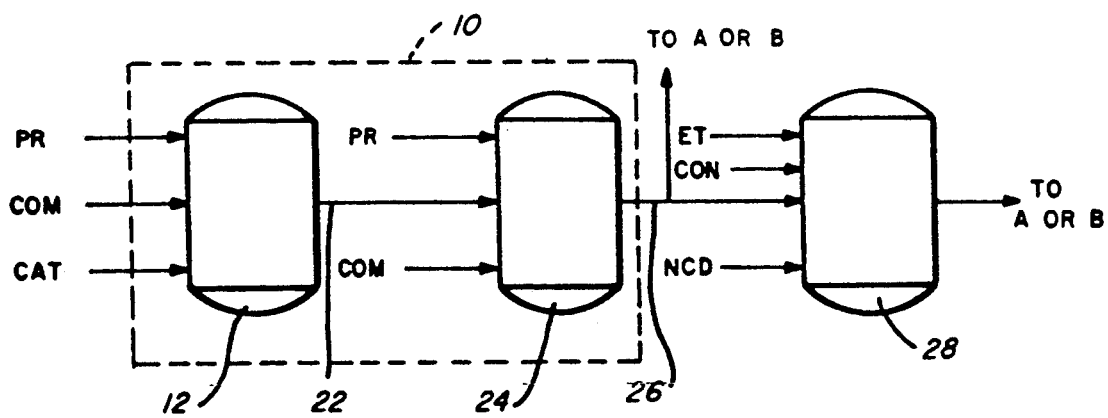
FIG. 2 is a schematic illustrating a preferred sequential reactor scheme which may be utilized in producing TPO alloys in accordance with the present invention.

Referring now to FIGS. 1 and 2, there is schematically illustrated a number of other preferred processing schemes for producing TPO alloys in accordance with the present invention. In all of the various process schemes, the RCP resin is produced in a reactor system generally designated as 10.

Referring now to FIG. 1, a propylene stream (PR), comonomer stream (COM) and catalyst (CAT) are fed into reactor system 10. As depicted in FIG. 1, reactor system 10 comprises a first reactor 12 for producing the desired RCP resin. It should be noted, however, that reactor system 10 and first reactor 12 may comprise a single reactor or a sequential series of reactors as further detailed below.

As previously mentioned, the propylene and comonomer(s), preferably ethylene, are polymerized in the presence of any one of a number of well-known Ziegler-type catalysts suitable for producing random propylene-based copolymers. An especially preferred catalyst system comprises a titanium trichloride catalyst component, diethyl aluminum chloride co-catalyst and methyl methacrylate modifier, such as disclosed in the aforementioned incorporated references.

The propylene and comonomer(s) are preferably polymerized in a liquid phase reaction in, for example, a continuous stirred reactor at temperatures ranging from about 35° C. to about 85° C., more preferably from about 45° C. to about 85° C., and pressures given by the vapor pressure of the various components.

A wide variety of RCP resins having varying comonomer concentrations and MFRs can be produced from reactor 12. Higher MFR resins can be directly produced in reactor 12 by the addition of a chain transfer agent such as, for example, hydrogen or diethyl zinc, during the polymerization reaction. The higher MFR resins so produced will preferably have an MFR of between about 1 to about 35, more preferably between about 5 to about 20, g/10 minutes. The addition of these chain transfer agents, however, will also limit the amount of comonomer which can be incorporated into the RCP resin without excessive agglomeration of particles and resulting processing difficulties and, therefore, is not preferred.

Lower MFR resins may be produced by excluding the aforementioned chain transfer agents from the polymerization reaction. This results in a very high molecular weight and very low MFR RCP resin, and allows the incorporation of much higher amounts of comonomer into the RCP resin without the aforementioned processing problems. It is preferred, therefore, that the low MFR resin produced from reactor 12 have an MFR of less than about 1.0 g/10 min., more preferably, less than about 0.1 g/10 min.

Referring back to FIG. 1, it can be seen that the RCP resins produced from reactor system 10 can be processed via several different paths to produce alloys in accordance with the present invention. As one example (path A), the alloy may be blended by high shear melt mixing the RCP resin in a mixer 14 with the desired types and amounts polypropylene (PP), OCE and organic peroxide (PER), as described above.

As another example for processing the RCP resins from reactor system 10 (path B), the RCP resins can be blended by melt mixing in a mixer 16 with the desired types and amounts of organic peroxide (PER) and, optionally, polypropylene (PP). The resulting blend may then be pelletized or otherwise processed for transport or storage (this intermediate step is generally designated as 18), and subsequently blended by high shear melt mixing in another mixer 20 with the desired types and amounts of polypropylene (PP) and OCE to produce alloys in accordance with the present invention.

As previously mentioned, reactor system 10 may comprise a sequential series of reactors. Referring now to FIG. 2, there is depicted schematically a preferred sequential reactor system in which, as before, a propylene stream (PR), comonomer stream (COM) and catalyst (CAT) are fed into first reactor 12. The resulting outlet stream 22 from first reactor 12, which will generally comprise the RCP resin, unreacted propylene, unreacted comonomer, residual chain transfer agent and catalyst, is then directly fed into a second reactor 24. Additional comonomer (COM) and propylene (PR) are also fed into second reactor 24 and a "reactor" blend of the RCP from first reactor 12 with a second propylene/monoolefin RCP is produced. The catalyst utilized in reactor 12 acts as the catalyst for the reaction in second reactor 24.

"Reactor" blend, as that term is used herein, generally means a highly dispersed blend of two or more components produced as a result of the formation of one polymer in the presence of another. While some block copolymerization may take place during the reactor blending, the amount is so minimal as to not substantially affect the properties of the final alloy.

The other reaction conditions in second reactor 24 are preferably the same as those previously described for first reactor 12. A chain transfer agent, as described above, may be utilized to control the molecular weight of the second RCP. It is preferred to ultimately produce high molecular weight, low MFR (less than about 1.0 g/10 min.) RCP resin reactor blends from second reactor 24 and reactor system 10.

The RCP reactor blend from second reactor 24, therefore, may be tailored to comprise varying comonomer contents and varying molecular weights by adjusting the feeds to reactors 12 and 24. For example, variation in the ethylene content of the RCP allows for a product of relatively high softening point (good heat distortion resistance) for a given level of flexural modulus. Also, variation in the molecular weight of the products of the two reactors results in a broadening of the molecular weight distribution of the resulting RCP reactor blend. This broadening allows products of superior heat sag (for thermoforming and blow molding) and also products of low viscosity at high shear rates (for injection molding).

The resulting RCP reactor blend from second reactor 24 can be processed via paths A or B as described above or, in a most preferred variation, the outlet stream 26 from second reactor 24, which will generally comprise the RCP reactor blend, unreacted propylene, unreacted comonomer, residual chain transfer agent and catalyst, can be directly fed into a third reactor 28 to which is also fed the ethylene (ET), comonomer (CON) and, if desired, nonconjugated diene (NCD) components of the OCE in the desired amounts. Preferably, the unreacted propylene and residual chain transfer agent are removed from outlet stream 26 prior to feeding into third reactor 28. The catalyst added to reactor 12 again acts as the catalyst for this reaction.

Unlike the reactions in reactors 12 and 24, the reaction in third reactor 28 is preferably a vapor phase reaction in, for example, a mechanically agitated gas phase reactor at temperatures ranging from about 60° C. to about 80° C. and at pressures ranging from about 140 psig to about 240 psig. The molar ratio of ethylene to total monomer in the gas phase reactor will generally range from about 0.25 to about 0.45.

The result from third reactor 28 is a second reactor blend of highly dispersed RCP resin and OCE. This second reactor blend may then directly be utilized as the TPO alloy or may be further processed along paths A or B as described above.

The alloys so produced by the aforedescribed methods will have wide ranging physical properties suitable for a variety of applications. For example, compositions having very high melt strength can be produced over a range of stiffness values by utilizing broad molecular weight distribution RCP reactor blends. These alloys will have particular utility for applications where the preferred fabrication technique is blow molding or vacuum forming. As another example, alloys which have relatively low flexural modulus but which retain good heat distortion resistance may be produced by the use of ternary mixtures of various RCPs, OCEs and polypropylenes. These alloys have particular utility where a molded part is required to pass through a heating step.

The foregoing more general discussion of this invention will be further exemplified by the following specific examples offered by way of illustration and not limitation of the above-described invention.

EXAMPLES

In the following examples, mechanical property evaluations were made employing the following tests:
(1) Melt Flow Rate—ASTM D-1238, Condition L.
(2) Flexural Modulus, secant—ASTM D-790.
(3) Shore D Hardness—ASTM D-2240.
(4) Notched Izod—ASTM D-256.
(5) Tensile Properties—ASTM D-638.
(6) Brittleness Temperature—ASTM D-746.
(7) Vicat Softening Temp.—ASTM D-1525.
(8) Shrinkage—ASTM D-995.
(9) Density—ASTM D-2240.
(10) Bending Beam Resiliency—a 5 in. ×0.5 in. ×0.125 in. specimen, held by a ½ in. mandrel, is bent at an angle of 90° and held for 3 seconds. After release, the specimen is allowed 2 minutes of unstressed recovery. The angle from the normal is then measured and reported as resiliency. 0° would constitute complete recovery and "perfect" resiliency.

The various materials utilized in the following examples are described below, with the final alloy compositions, MFRs and densities presented in Table I.
(A) PP-4092—a commercial crystalline polypropylene having an MFR of about 2 g/10 min., available from Exxon Chemical Company, Houston, Tx.
(B) Vistalon 719—a commercial ethylene/propylene copolymer elastomer having an ethylene content of about 77% by weight and a Mooney viscosity of about 78 (1+8, 100° C.), available from Exxon Chemical Company, Houston, Tx.
(C) RCP1—a propylene/ethylene random copolymer resin tailored to an ethylene content of about 4.5% by weight with an MFR of about 0.3 g/10 min. This RCP resin was produced by feeding 80 lb/hr propylene, 3 lb/hr ethylene, 100 ppm by weight (based upon the propylene feed) of a titanium catalyst component, 650 ppm by weight (based upon the propylene feed) of diethyl aluminum chloride and 15 ppm by weight (based upon the propylene feed) of methyl methacrylate modifier into a first continuous stirred reactor operating at about 65° C. and a vapor pressure given by the vapor pressure of the resulting liquid at this temperature. The average residence time in the reactor was about 2.5 hours.

On a laboratory scale, the titanium trichloride catalyst component may be prepared by adding 180 ml of 4M diethyl aluminum chloride (DEAC) over 6 hours to 71.1 ml of neat $TiCl_4$ in 278.1 ml of hexane in a one liter reactor at a temperature controlled between about −2° C. to about +2° C. Upon completion of the DEAC addition, the reaction was maintained for one hour, then heated at a rate of 120° C. to 20° C. then 2° C. to 65° C. and maintained at 65° C. for another hour. To the resultant brownish $TiCl_3$ solids with mother liquor was added 60 ml of hexane. This slurry was contacted in a nitrogen purged one liter reactor equipped with an agitator with 55.8 g of propylene by passing propylene into the reactor at a rate of about 1 g/min. and at a temperature of about 38° C. to obtain a prepolymerized TiCl₃ comprising about 30 wt% polymer. The recovered hexane washed (4× by decantation in 681 ml hexane at 60° C. and settling ½hour prior to decantation) prepolymerized TiCl₃ wet cake was contacted in 116 ml hexane containing 109 g of hexachloroethane and 90 g di-n-butyl ether. The reactor was heated to 85° C. and held at this temperature for 5 hours with agitation. The recovered TiCl₃ catalyst was washed 4× in hexane by decantation and dried to yield the finished catalyst component. For ease of feeding to the polymerization reactor, the catalyst component was used as a 30 wt % slurry in a mineral oil.

The catalyst actually used for these examples was prepared in a scaled-up version of this laboratory procedure.

The slurry from the first continuous stirred reactor was then fed to a second continuous stirred reactor operating at about 65° C., to which was fed 35 lb/hr additional propylene, 0.2 lb/hr additional ethylene and 500 ppm by weight (based upon the weight of the liquid propylene) of hydrogen as a chain transfer agent. The residence time in this second reactor was about 1 hour.

The slurry from this second continuous stirred reactor was washed by continuous countercurrent contacting with a mixture of propylene and n-butyl alcohol, then dried by heating at 100° C. in an agitated, nitrogen gas swept dryer.

(D) RCP2—a propylene/ethylene random copolymer resin tailored to an ethylene content of about 6.0% by weight with an MFR of less than 0.1 g/10 min. This RCP resin was produced as described above for RCP1 except that the slurry from the first reactor was fed to the second reactor along with 35 lb/hr additional propylene and 1 lb/hr additional ethylene. No chain transfer agent was added to the second reactor. The second reactor was operated at about 60° C., and the average residence time was about 1.5 hours.

TABLE I

| EX. | WT % PP-4092 | WT % V-719 | WT % RCP1 | WT % RCP2 | MFR (g/10 min.) | DENS. (g/cc) |
|---|---|---|---|---|---|---|
| C1 | 50 | 50 | 0 | 0 | 1.03 | 0.8927 |
| 1 | 25 | 50 | 25 | 0 | 1.25 | 0.8900 |
| 2 | 17 | 17 | 66 | 0 | 1.18 | 0.8920 |
| 3 | 0 | 25 | 75 | 0 | 3.31 | 0.8895 |
| 4 | 17 | 33 | 50 | 0 | 2.45 | 0.8907 |
| 5 | 33 | 33 | 33 | 0 | 1.85 | 0.8930 |
| C2 | 0 | 0 | 100 | 0 | 6.46 | 0.8927 |
| 6 | 0 | 50 | 50 | 0 | 1.76 | 0.8876 |
| 7 | 17 | 17 | 0 | 66 | 2.76 | 0.8899 |
| 8 | 25 | 50 | 0 | 25 | 1.16 | 0.8895 |
| C3 | 0 | 0 | 0 | 100 | 4.05 | 0.8876 |
| 9 | 17 | 33 | 0 | 50 | 1.92 | 0.8890 |
| 10 | 0 | 25 | 0 | 75 | 2.63 | 0.8875 |
| 11 | 33 | 33 | 0 | 33 | 1.65 | 0.8900 |
| 12 | 0 | 50 | 0 | 50 | 1.28 | 0.8850 |

COMPARATIVE EXAMPLE 1

75 lbs. of PP-4092 and 75 lbs. of Vistalon 719 were tumble blended, extruded on a W.P. extruder then reextruded on a 60 mm Reifenhouser extruder to produce Sample 1. Sample 1 was injection molded in a 300 ton Van Dorn Model 300RS-14F-UHS injection molding press into standard parts for the various ASTM tests, then tested for selected mechanical properties. The results are presented in Table II.

EXAMPLE 1

150 lbs. of RCP1 was admixed with Lupersol 101, a 2,5-dimethyl-2,5-di(t-butylperoxy)hexane available from the Lucidol Division of the Penwalt Corp., Buffalo, N.Y., and extruded on a 60 mm Reifenhouser extruder at 450° F. to an MFR of 5.5 g/10 min. to produce Sample 2. 75 lbs. of Sample 2 was admixed with 75 lbs. of Vistalon 719 in a barrel tumbler then extruder mixed on a W.P. extruder to produce Sample 3. 6 lbs. of Sample 1 and 6 lbs. of Sample 3 were then tumble mixed, extruded on a 60 mm Reifenhouser extruder at 450° F., injection molded and tested as in Comparative Example 1. The results are present in Table II.

EXAMPLE 2

4 lbs. of Sample 1 and 8 lbs. of Sample 2 were tumble mixed, extruded, molded and tested as in Example 1. The results are presented in Table II.

EXAMPLE 3

6 lbs. of Sample 3 and 6 lbs. of Sample 2 were tumble mixed, extruded, molded and tested as in Example 1. The results are presented in Table II.

EXAMPLE 4

4 lbs. of Sample 2, 4 lbs. of Sample 1 and 4 lbs. of Sample 3 were tumble mixed, extruded, molded and tested as in Example 1. The results are presented in Table II.

EXAMPLE 5

4 lbs. of Sample 2 and 8 lbs. of Sample 1 were tumble mixed, extruded, molded and tested as in Example 1. The results are presented in Table II.

COMPARATIVE EXAMPLE 2

12 lbs. of Sample 2 was extruded, molded and tested as in Example 1. The results are presented in Table II.

EXAMPLE 6

12 lbs. of Sample 3 was extruded, molded and tested as in Example 1. The results are presented in Table II.

EXAMPLE 7

150 lbs. of RCP2 was admixed with Lupersol 101 and extruded on a 60 mm Reifenhouser extruder to an MFR of 1.0 g/10 min. to produce Sample 4. 8 lbs. of Sample 4 and 4 lbs. of Sample 1 were tumble mixed, extruded, molded and tested as in Example 1. The results are presented in Table II.

EXAMPLE 8

75 lbs. of Sample 4 was tumble mixed with 75 lbs. of Vistalon 719 then extruded on a W.P. extruder to produce Sample 5. 6 lbs. of Sample 5 and 6 lbs. of Sample 1 were tumble mixed, extruded, molded and tested as in Example 1. The results are presented in Table II.

COMPARATIVE EXAMPLE 3

12 lbs. of Sample 4 was extruded, molded and melt blended as in Example 1. The results are presented in Table II.

EXAMPLE 9

4 lbs. of Sample 1, 4 lbs. of Sample 4 and 4 lbs. of Sample 5 were tumble blended, extruded, molded and tested as in Example 1. The results are presented in Table II.

EXAMPLE 10

6 lbs. of Sample 4 and 6 lbs. of Sample 5 were tumble blended, extruded, molded and tested as in Example 1. The results are presented in Table II.

EXAMPLE 11

4 lbs. of Sample 4 and 8 lbs. of Sample 1 were tumble blended, extruded, molded and tested as in Example 1. The results are presented in Table II.

EXAMPLE 12

12 lbs. of Sample 5 was extruded, molded and tested as in Example 1. The results are presented in Table II.

TABLE II

| EX. | FLEX. MOD. (psi × 10 − 3) | HARDNESS SHORE D (10/SEC. DEL.) | NOT. IZOD (ft-lbs/in) ROOM | NOT. IZOD (ft-lbs/in) −29° C. | TENSILE (psi) Yield | TENSILE (psi) Break | BRITTLE TEMP (°F.) | VICAT SOFT. PT. (°C.) | SHRINK (%) | RESIL (°) |
|---|---|---|---|---|---|---|---|---|---|---|
| C1 | 53.0 | 46.5 | DNB | PB | 2397 | 1925 | <−96 | 93 | 0.62 | 13.0 |
| 1 | 36.1 | 45.0 | DNB | PB | 2095 | 2121 | <−96 | 94 | 0.75 | 11.0 |
| 2 | 65.7 | 54.7 | 3.5 | 0.88 | 3120 | 2384 | −22 | 118 | 1.17 | 14.2 |
| 3 | 49.5 | 50.8 | DNB | 1.10 | 2486 | 2294 | −54 | 104 | 1.20 | 13.6 |
| 4 | 53.0 | 49.8 | PB | 1.60 | 2490 | 2203 | −51 | 102 | 1.12 | 13.8 |
| 5 | 62.8 | 52.0 | PB | 1.90 | 2749 | 2053 | −78 | 115 | 1.11 | 13.0 |
| C2 | 75.5 | 58.5 | 2.4 | 0.48 | 3605 | 2401 | 12 | 116 | 1.28 | 14.0 |
| 6 | 28.3 | 41.0 | DNB | PB | 1639 | 1927 | <−96 | 80 | 1.07 | 10.5 |
| 7 | 48.7 | 51.5 | DNB | 0.99 | 2588 | 2338 | −35 | 108 | 1.25 | 13.0 |
| 8 | 33.8 | 42.5 | DNB | PB | 1923 | 2014 | <−96 | 80 | 0.88 | 11.0 |
| C3 | 49.2 | 53.5 | PB | 0.49 | 2787 | 2298 | −20 | 107 | 1.32 | 12.1 |
| 9 | 38.3 | 47.0 | DNB | 2.30 | 2131 | 2203 | −78 | 95 | 1.20 | 11.5 |
| 10 | 30.3 | 43.2 | DNB | 1.88 | 1966 | 2151 | −69 | 96 | 1.21 | 11.6 |
| 11 | 50.2 | 48.5 | DNB | 2.10 | 2491 | 2275 | −68 | 103 | 1.09 | 13.5 |
| 12 | 17.8 | 36.7 | DNB | PB | 1274 | 1644 | <−96 | 70 | 1.12 | 9.5 |

DNB = did not break
PB = partial break

These examples generally show that the thermoplastic olefin alloys in accordance with the present invention provide a similar or improved combination of resiliency, impact strength, flexibility, heat distortion resistance, surface hardness and elasticity properties as do the standard thermoplastic olefin compositions as typified by Comparative Example 1. Further, the TPO alloys of the present invention accomplish such combination of properties by utilizing less OCE than the conventional composition, generally meaning that the present TPO alloys will have improved cosmetic and moldability characteristics at less cost.

Many modifications and variations besides the embodiments specifically mentioned may be made in the compositions and methods described herein and depicted in the accompanying drawing without substantially departing from the concept of the present invention. Accordingly, it should be clearly understood that the form of the invention described and illustrated herein is exemplary only, and is not intended as a limitation on the scope thereof.

What is claimed is:

1. A process for producing a thermoplastic olefin alloy, comprising the steps of:

feeding propylene, ethylene and a catalyst to a first reactor to at least partially copolymerize said propylene and ethylene to produce a first random propylene/ethylene copolymer, thereby generating an outlet stream comprising said first random copolymer, unreacted propylene, unreacted ethylene and said catalyst;

feeding said outlet stream, additional propylene and additional ethylene into a second reactor to produce a reactor blend of said first random copolymer with a second random propylene/ethylene copolymer, said reactor blend having an ethylene content of from 3% to 8% by weight and an MFR of less than 1;

blending from 50% to 88% by weight, based upon the weight of said alloy, of said reactor blend, from 12% to 23% by weight, based upon the weight of said alloy, of an olefin copolymer elastomer, and from 0% to 33% by weight based upon the weight of the alloy, of polypropylene; and increasing the MFR of said alloy by blending said alloy in the presence of an organic peroxide.

2. The process according to claim 1, wherein said reactor blend has an MFR of less than 0.1.

3. The process according to claim 1 or 2, wherein the MFR of said reactor blend is increased by blending said reactor blend with said organic peroxide before said reactor blend is blended with said olefin copolymer elastomer, the MFR of said reactor blend being increased to from 1 to 35.

4. The process according to claim 1 or 2, wherein said MFR of said alloy is increased from 1 to 35.

5. A process for producing a thermoplastic olefin alloy, comprising the steps of:

feeding propylene, ethylene and a catalyst to a first reactor to at least partially copolymerize said propylene and ethylene to produce a first random propylene/ethylene copolymer, thereby generating a first outlet stream comprising said first random propylene/ethylene copolymer, unreacted propylene, unreacted ethylene and said catalyst;

feeding said first outlet stream, additional propylene and additional ethylene into a second reactor to produce a first reactor blend of said first random propylene/ethylene copolymer with a second random propylene/ethylene copolymer, thereby generating a second outlet stream comprising said first reactor blend, unreacted propylene, unreacted ethylene and said catalyst, said first reactor blend having an ethylene content of from 3% to 8% by weight and an MFR of less than 1;

feeding said second outlet stream, a monoolefin selected from one or more of $C_3$ to $C_{10}$ alpha-olefins, and ethylene into a third reactor to produce a second reactor blend of said first reactor blend with an olefin copolymer elastomer; and increasing the MFR of the reactor blend to from 1 to 35 by blending the reactor blend in the presence of an organic peroxide.

6. The process according to claim 5, wherein said alloy comprises from 70% to 88% by weight, based upon the weight of said alloy, of said first reactor blend.

7. The process according to claim 5 or claim 6, further comprising blending said second reactor blend with from 0% to 33% by weight, based upon the weight of said alloy, of polypropylene.

8. The process according to any of claims 5 to 7, wherein said first reactor blend has an MFR of less than 0.1.

9. The process according to any of claims 5 to 8, further comprising feeding a non-conjugated diene into said third reactor.

10. The process according to any of claims 5 to 9, further comprising the step of removing said unreacted propylene from said second outlet stream prior to feeding said second outlet stream into said third reactor.

* * * * *